United States Patent Office 3,314,033
Patented Apr. 11, 1967

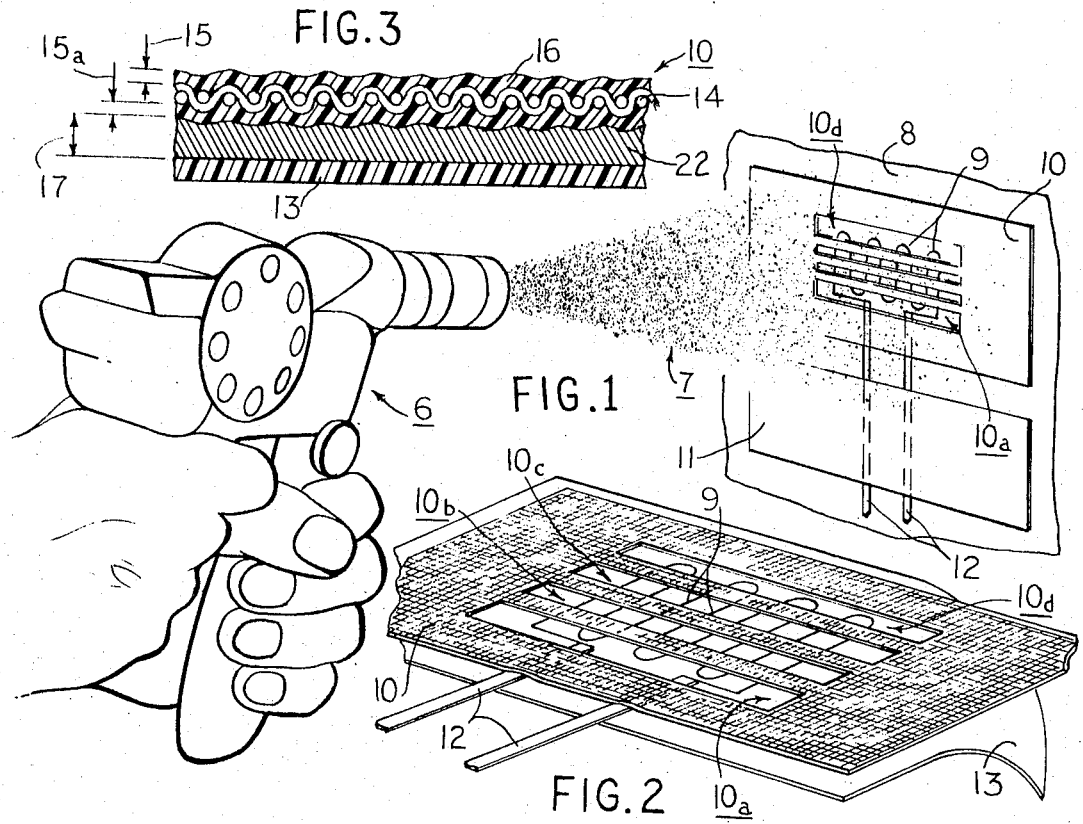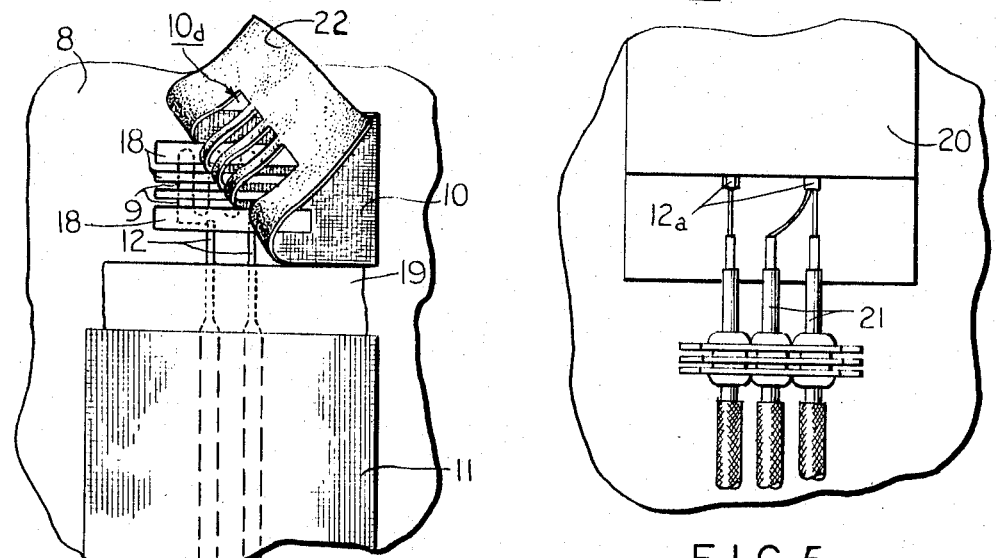

3,314,033
GAGE UNITS FOR FLAME-SPRAY
INSTALLATION
Stephen P. Wnuk, Jr., Marlborough, Mass., assignor to
BLH Electronics, Inc., Waltham, Mass., a corporation
of Delaware
Filed Jan. 29, 1965, Ser. No. 428,939
3 Claims. (Cl. 338—2)

The present invention relates to improvements in grid-type electrical strain and temperature gages, and the like, and, in one particular aspect, to a novel and improved strain gage arrangement wherein special pressure-sensitive tape in the form of a self-protecting open frame adhesively supports the gage conductors during initial application to a surface by a flame-spray process and yet retains the structural integrity needed for removal, despite destructive influences of the flame-sprayed material.

Wire and foil elements disposed in substantially sinuous planar grid patterns have been widely used for sensing surface conditions, such as strain and temperature, and have conventionally been applied to the surfaces under investigation by bonding cements and the like. In the interests of realizing as intimate a mounted relationship as possible between the gage elements and the surfaces to which they are affixed, it has also been known to utilize adhesive-backed flexible frames, of metal foil or plastic, as temporary supports for the grids, with portions of the wire or foil elements being exposed through openings or windows through the frames. These frames are each adhesively attached, temporarily, to a surface upon which a grid of gage element is to be permanently secured, and a refractory oxide is flame-sprayed through the openings onto the surface and about the exposed portions of the gage elements. Theoretically, the frame can then be peeled from the surface, leaving the grid in place upon the surface, and the remaining areas which then require coating may be similarly flame-sprayed. In practice, however, it is found either that the flexible frames tend to deteriorate so extensively under influence of the very high flame-spray temperatures and impacting of sprayed particles that they break readily and cannot be removed easily and without undue risk of damaging the sensitive grid, or that the spray tends to build up excessively on the frame where it is not wanted. The problem is not properly solved merely by making the frames thicker, because the resulting rigidity makes removal of the frames more difficult, and because frames which are too thick tend to interfere with uniform spraying through the small frame openings.

Accordingly, it is one of the objects of the present invention to provide improvements in the flame-spray installation of fine gage grids, utilizing a flexible frame having a woven reinforcement protectively coated to prevent its deterioration.

Another object is to provide a novel and improved low-cost flame-sprayable gage unit including a removable flexible backing tape having the shape of an open frame and including woven fiberglass protectively coated on the exterior by a polytetrafluoroethylene layer which is at least about one thousandth of an inch in thickness.

By way of a summary account of practice of this invention in one of its aspects, a grid-type wire strain gage is backed by a flexible windowed frame or carrier having a tough woven fiberglass layer coated on both sides with polytetrafluoroethylene, the layer on the outer side, opposite that upon which the gage is applied, being at least about one thousandth of an inch thick. When the gage and carrier are affixed to a surface, a flame-spray of molten aluminum oxide for about one minute builds up a 3–6 mil coating on the surface and about the wiring exposed through the carrier windows, and, although the outer layer of polytetrafluoroethylene is found to be eroded, the glass cloth layer remains substantially continuous and unbroken, so that it may be peeled away from the surface without breakage.

Although the aspects of this invention which are believed to be novel are set forth in the appended claims, additional details as to preferred practices of the invention and as to the further objects, advantages and features thereof may be most readily comprehended through reference to the following description taken in connection with the accompanying drawings, wherein:

FIGURE 1 illustrates a frame-mounted grid-type strain gage being flame-sprayed onto a measurement surface;

FIGURE 2 is a pictorial view of a portion of an improved frame-mounted strain gage assembly;

FIGURE 3 provides a cross-section of part of a coated woven frame and its backing materials;

FIGURE 4 depicts the improved frame in the process of removal after a first stage of flame-spraying has covered a portion of the gage wiring; and FIGURE 5 portrays the attachment of lead wires to exposed terminals after final flame-spraying has been accomplished.

The flame-spray gage installation practice depicted in FIGURE 1 involves the use of a known type of hand-held spray gun, 6, wherein a pure aluminum oxide refractory or the like is melted, atomized, and blown as a spray of molten particles, 7, against a metal test surface 8 of an article to which a strain gage 9 is to be applied. Generally, such surfaces are first cleaned and sand-blasted, to improve the adherence of the sprayed material, and a pre-coat of the material is commonly applied before the gage is taped onto it by way of a windowed frame or carrier 10 and an auxiliary tape 11 which holds the lead ribbons 12. As is shown in FIGURE 2, the rectangular frame 10 is formed with a plurality of apertures preferably shaped as closely-spaced slots 10a–10d, which serve as windows through which the sprayed particles may pass to reach the surface 8 (FIGURE 1) and to cover the sinuously-arranged strain gage elements 9. Before being readied for taping onto the test surface, windowed frame 10, which has an adhesive layer 22 (FIGURE 3) on its back, is temporarily adhered to a thin protective plastic or paper backing member 13, which may be readily parted from the adhesive layer when the gage is to be installed. The fine gage elements 9, represented in enlargement in the drawings, are sandwiched between the adhesive layer and backing, and tend to remain affixed to the back of the frame when the backing member is removed. These may be wire or foil elements of a strain gage, or of a temperature-responsive gage, for example. Portions of the thin ribbon leads 12 connected with the ends of the gage are also similarly sandwiched and held in place.

It has been found that polytetrafluoroethylene material is highly desirable in construction of the frames and lead tapes, inasmuch as it tends to shed the sprayed refractory particles and thereby avoid build-up of the sprayed material upon it. In this connection, it should be understood that the deposits are desired only upon the test surface, through the frame apertures, and that build-up and adherence elsewhere can cause difficulties when the tape frame is to be removed from the test surface. Unfortunately, this plastic material alone, when in sheets thin enough to be flexible, does not maintain dimensional stability during handling. A fabric-like mat, of material such as glass fibers which withstand the very high temperatures involved, has been found to offer an advantageously great strength, without undue stiffness, and has thus promised to maintain a structural integrity needed for uniform non-destructive peel-off of the tape frame after flame-spraying. However, the glass fabric mat itself tends to be so seriously eroded by the spray as to become intolerably weakened or broken unless made undesirably thick. I have found that these difficulties can nevertheless be satisfactorily resolved if the strands of a thin flexible fiberglass mat 14 (FIGURE 3) are covered with polytetrafluoroethylene material 15, on the side which is to face the spray. The thickness 15 of covering 16 must be at least about 0.001 inch, a layer of 0.0005 inch being incapable of adequately protecting the underlying glass fabric from the aforementioned damage by the spray. Thicknesses of 20 mils or so are excessive in that the assembly is then too stiff for the intended purposes. In a preferred practice, the glass fiber strands are themselves each only about 1 mil or so in cross-section, and are each made up of numerous smaller glass filaments; the woven fabric 14 is conveniently made with a coating on both sides, such that a further polytetrafluoroethylene layer of the same thickness, 15a, appears next to the adhesive layer 22. Typically, that pressure-sensitive layer may comprise a known silicone-base adhesive, and its thickness, 17, may be up to about 2 mils.

The molten-particle spray 7 causes almost complete erosion of a one-mil layer 16, because of combined thermal and abrasive effects occurring thereat during a typical one-minute spray of aluminum oxide deposits 18 (FIGURE 4) to an average thickness of 5–6 mils. This extensive erosion is permissible, because the underlying woven fiberglass reinforcement 14 nevertheless retains its structural integrity and thereby does not break when peeled away in the manner characterized for frame 10 in FIGURE 4. In the same step, a like deposit 19 is applied over the narrow portions of flat leads 12, the remaining portions being held in place upon the test surface 8 by the auxiliary tape 11; the latter tape is constructed in the same manner as frame 10, for the same reasons. After both the frame 10 and auxiliary tape 11 have been removed, following the initial flame-spray which bonds portions of the gage elements 9 and leads 12 to the test surface, a further similar flame spray deposit 20 (FIGURE 5) is applied to cover the remaining exposed portions of these elements and leads. However, a small further strip of auxiliary tape, like the tape and frame already described, is then used to cover the lead ends 12a, such that these will ultimately be left exposed for the illustrated connections (FIGURE 5) of lead terminals 21.

It should be understood that the embodiments and practices described and portrayed have been presented by way of disclosure, rather than limitation, and that various modifications, combinations and substitutions may be effected without departure from the spirit and scope of this invention in its broader aspects.

What I claim as new and desire to secure by Letters Patent of the United States is:

1. An electrical sensor adapted to be affixed to a test surface by a deposit of flame-sprayed material, comprising electrically-conductive sensor elements disposed in a substantially planar grid pattern, electrical leads in electrical contact with said sensor elements, a flexible frame having a layer of pressure-sensitive adhesive on one side thereof adhesively secured to portions of said elements and having openings therethrough which expose other portions of said elements, said frame including a flexible heat-resistant reinforcement member and a covering of polytetrafluoroethylene at least about one thousandth of an inch thick over the side of said reinforcement member opposite said one side, whereby a molten refractory oxide may be flame-sprayed onto a test surface and over the exposed portions of said elements through said openings without so eroding the reinforcement member as to prevent its being peeled away from the test surface without breaking.

2. An electrical sensor adapted to be affixed to a test surface by a deposit of flame-sprayed refractory oxide material, comprising a flexible frame in the form of a tape including a flexible woven fiberglass reinforcement member having a plurality of elongated slots therethrough, a coating of polytetrafluoroethylene at least about one thousandth of an inch thick on at least one side of said woven fiberglass reinforcement member, and a layer of pressure-sensitive adhesive on the other side of said reinforcement member, a substantially planar grid of electrically-conductive sensor elements adhesively secured to said layer of adhesive with portions thereof exposed through said slots, and electrical leads in electrical contact with said sensor elements whereby a molten refractory oxide may be flame-sprayed onto a test surface and over the exposed portions of said elements through said slots while eroding the said polytetrafluoroethylene coating and without so eroding the fiberglass reinforcement as to prevent its breaking when being peeled away from the test surface to which it adheres by way of said adhesive layer.

3. An electrical sensor adapted to be affixed to a test surface by a deposit of flame-sprayed refractory oxide material, as set forth in claim 2, wherein said woven reinforcement member consists of fiberglass strands about one thousandth of an inch thick each made up of a plurality of glass filaments, wherein said coating of polytetrafluoroethylene covers said strands on both sides of said reinforcement member, wherein said polytetrafluoroethylene is not in excess of about twenty thousandths of an inch in thickness and wherein said sensor elements comprise strain-responsive electrical resistance elements arranged in a sinuous grid pattern connected at its ends with said electrical leads, at least a portion of each of said leads being adhesively secured to said layer of pressure-sensitive adhesive with another portion thereof being exposed through at least one of said slots.

References Cited by the Examiner

UNITED STATES PATENTS

| | | | |
|---|---|---|---|
| 2,363,181 | 11/1944 | Howland | 338—2 |
| 2,569,499 | 10/1951 | Shoub | 338—2 |
| 2,626,338 | 1/1953 | Mitchell | 338—2 |
| 2,719,907 | 10/1955 | Combs | 219—528 |
| 2,963,773 | 12/1960 | Starr | 338—2 X |
| 3,064,221 | 11/1962 | King | 338—2 |
| 3,172,072 | 3/1965 | Willy | 338—210 |
| 3,191,005 | 6/1965 | Cox | 219—549 |
| 3,197,335 | 7/1965 | Leszynski | 338—2 X |
| 3,215,574 | 11/1965 | Korb. | |

RICHARD M. WOOD, *Primary Examiner.*

W. D. BROOKS, *Assistant Examiner.*